US009203743B2

(12) United States Patent
Yamaguchi

(10) Patent No.: US 9,203,743 B2
(45) Date of Patent: Dec. 1, 2015

(54) PACKET FORWARDING SYSTEM, CONTROL DEVICE, FORWARDING DEVICE AND METHOD AND PROGRAM FOR PREPARING PROCESSING RULES

(75) Inventor: Syuuhei Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 364 days.

(21) Appl. No.: 13/634,868

(22) PCT Filed: Mar. 22, 2011

(86) PCT No.: PCT/JP2011/056786
§ 371 (c)(1),
(2), (4) Date: Sep. 13, 2012

(87) PCT Pub. No.: WO2011/118566
PCT Pub. Date: Sep. 29, 2011

(65) Prior Publication Data
US 2013/0010803 A1 Jan. 10, 2013

(30) Foreign Application Priority Data

Mar. 24, 2010 (JP) ................................. 2010-068902

(51) Int. Cl.
*H04L 12/725* (2013.01)
*H04L 12/26* (2006.01)
(Continued)

(52) U.S. Cl.
CPC .............. *H04L 45/308* (2013.01); *H04L 45/74* (2013.01); *H04L 69/22* (2013.01); *H04L 43/026* (2013.01)

(58) Field of Classification Search
None
See application file for complete search history.

(56) References Cited

U.S. PATENT DOCUMENTS 6,014,659 A * 1/2000 Wilkinson et al. ............. 707/769
6,266,706 B1 * 7/2001 Brodnik et al. ................ 709/242
(Continued)

FOREIGN PATENT DOCUMENTS

CN 101159659 4/2008
JP 2000-188608 A 7/2000
(Continued)

OTHER PUBLICATIONS

European Search Report dated Oct. 24, 2013.
(Continued)

*Primary Examiner* — Chirag Shah
*Assistant Examiner* — Suk Jin Kang
(74) *Attorney, Agent, or Firm* — McGinn IP Law Group, PLLC

(57) ABSTRACT

In a method and a configuration for forming a processing rule, number of entries for packet processing, maintained by a forwarding node, may be decreased. The processing rule includes processing contents and information to become a matching key to identify a packet to be applied with the processing contents. An aggregation tree is used which has a depth corresponding to a length of information that becomes matching key in the processing rule. A plurality of nodes branched from a root of the aggregation tree and levels of nodes represent value of the matching key and mask length, respectively. The processing rule or the policy is registrable in each of the individual nodes. The policy is registered in a relevant node of the aggregation tree. For each received packet, processing contents and ad-hoc matching key to identify the packet to be applied with the processing contents are determined by having reference to the policy. Then, based on the ad-hoc matching key, the aggregation tree is traced from its root downwards to find a node beyond which along the depth of the tree there is no policy registered. The processing rule having the node as the matching key is then formed.

15 Claims, 13 Drawing Sheets

(51) Int. Cl.
*H04L 12/741* (2013.01)
*H04L 29/06* (2006.01)

(56) References Cited

U.S. PATENT DOCUMENTS

| | | | | |
|---|---|---|---|---|
| 6,631,419 | B1 * | 10/2003 | Greene | 709/238 |
| 6,813,645 | B1 | 11/2004 | Meyer | |
| 6,947,931 | B1 * | 9/2005 | Bass et al. | 1/1 |
| 7,031,313 | B2 | 4/2006 | Yazaki et al. | |
| 7,061,874 | B2 * | 6/2006 | Merugu et al. | 370/255 |
| 7,107,265 | B1 * | 9/2006 | Calvignac et al. | 1/1 |
| 7,522,602 | B2 | 4/2009 | Yazaki et al. | |
| 7,536,476 | B1 * | 5/2009 | Alleyne | 709/238 |
| 2001/0043602 | A1 * | 11/2001 | Brown | 370/392 |
| 2002/0061022 | A1 * | 5/2002 | Allen et al. | 370/392 |
| 2003/0012197 | A1 | 1/2003 | Yazaki et al. | |
| 2003/0123459 | A1 * | 7/2003 | Liao | 370/401 |
| 2003/0174717 | A1 * | 9/2003 | Zabarski et al. | 370/401 |
| 2004/0236720 | A1 * | 11/2004 | Basso et al. | 707/1 |
| 2005/0076010 | A1 * | 4/2005 | Bass et al. | 707/3 |
| 2005/0177552 | A1 * | 8/2005 | Bass et al. | 707/3 |
| 2006/0126624 | A1 | 6/2006 | Yazaki et al. | |
| 2006/0173831 | A1 * | 8/2006 | Basso et al. | 707/3 |
| 2011/0274112 | A1 * | 11/2011 | Czaszar et al. | 370/392 |

FOREIGN PATENT DOCUMENTS

| | | |
|---|---|---|
| JP | 2001-144801 A | 5/2001 |
| JP | 2003-018204 A | 1/2003 |

OTHER PUBLICATIONS

Zhenzhen Ye, et al., "Optimal Stochastic Policies for Distributed Data Aggregation in Wireless Sensor Networks", IEEE/ACM Transactions on Networking, IEEE/ACM, New York, NY, US, vol. 17, No. 5, Oct. 1, 2009, pp. 1494-1507, XP011271765.

International Search Report in PCT/JP2011/056789 dated Jun. 14, 2011 English Translation Thereof.

Nick McKeown et al., "OpenFlow: Enabling Innovation in Campus Networks", [online], [retrieved on Feb. 15, 2010], Internet <URL: http://www.openflowswitch.org/documents/openflow-spec-v0.9.0.pdf>, Mar. 14, 2008.

"Open Flow Switch Specification" Version 0.9.0 (Wire Protocol 0+98) [retrieved Feb. 15, 2010]Internet <URL: http://www.openflowswitch.org/documents/openflow-spec-v0.9.0.pdf>, Jul. 20, 2009.

Hiroshi Ueno, et al., "A Study on Development of Network Appliance Functionalities in Datacenter Network", IEICE Technical Report, Nov. 13, 2009, vol. 19, No. 296, pp. 7 to 12.

Chinese Office Action dated May 19, 2014, with English translation.

* cited by examiner

US 9,203,743 B2

PACKET FORWARDING SYSTEM, CONTROL DEVICE, FORWARDING DEVICE AND METHOD AND PROGRAM FOR PREPARING PROCESSING RULES

TECHNICAL FIELD

Reference to Related Application

The present application asserts priority rights based on JP Patent Application No. 2010-068902 filed in Japan on Mar. 24, 2010. The entire of disclosure thereof is incorporated by reference into the present Application.

This invention relates to a packet forwarding system, a control device, a forwarding device, a method for preparation of processing rules and a computer program. More particularly, it relates to a packet forwarding system having a control plane that manages a flow in accordance with a policy and a data plane that performs signal processing. It also relates to a corresponding control device, a corresponding forwarding device and a method as well as a computer program for preparing processing rules.

BACKGROUND

In Patent Document 1, there is disclosed a packet forwarding device with which it is possible to collect a plurality of flows into one flow bundle which may then be processed or handled. Specifically, the packet forwarding device of the Patent Document includes a flow detection device and a control device. The flow detection device discriminates, from the header information of an input packet, the flow to which the input packet belongs, and outputs flow bundle identification which is innate to the discriminated flow or which is common to at least one other flow. The control device has an information table including a plurality of information entries corresponding to the flow bundle identification. The control device reads out a single information entry from the information table, based on the flow bundle identification received from the flow detection device, in order to execute a pre-set operation.

In Non-Patent Documents 1, 2, there is proposed an open flow (OpenFlow) which similarly comprehends communication as an end-to-end flow (see Non-Patent Documents 1 and 2). The open flow optimizes route control, recovery from malfunctions, load balancing and optimization on the flow-by-flow basis. The open-flow switch, operating as a forwarding node, includes a secure channel for communication with an open flow controller that may be deemed as a controller. The open-flow switch operates in accordance with a flow table that is instructed from time to time to add or re-write its entries.

Patent Document 1

JP Patent Kokai Publication No. JP-P2003-18204A

Non-Patent Document 1

Nick McKeown et al., "OpenFlow: Enabling Innovation in Campus Networks", [online], [retrieved on Feb. 15, 2010], Internet

Non-Patent Document 2

"OpenFlow Switch Specification" Version 0.9.0 (Wire Protocol 0x98) [retrieved Feb. 15, 2020] Internet

SUMMARY

The entire disclosures of Patent Document 1 and Non-Patent Documents 1 and 2 are incorporated by reference into the present application.

The following analysis is by the present inventor.

As pointed out in Patent Document 1, if the number of information entries, used by forwarding nodes, viz., switches or routers, is increased, the following problems arise. Viz., the number or the capacity of the memories for maintaining these information entries is increased, while the processing for retrieving these information entries becomes time-consuming, thus degrading the packet forwarding capability.

On the other hand, if the flow entries are increased, such problem arises that, in case of a change in the network topology caused by network malfunctions or maintenance, the onus of management involved in its rewriting is increased.

In this respect, in the packet forwarding device of Patent Document 1, flow bundle identification is used to perform band check or to collect the statistic information, while the number of the information entries used for packet processing is not decreased (see paragraph 23 'routing table' and FIG. 7 of Patent Document 1).

It is an object of the present invention to provide a packet forwarding system, a control device, a forwarding device, a method for preparation of processing rules, and a computer program, wherein the number of entries for packet processing, maintained by a forwarding node, may be decreased.

A packet forwarding system in a first aspect of the present invention includes a policy memory that holds in store a policy that prescribes processing contents and a matching key that identifies a packet to apply the processing contents to The packet forwarding system also includes a policy management unit that refers to a policy in connection with a packet received to determine the processing contents and an ad-hoc (temporary) matching key that identifies a packet to apply the processing contents to. The packet forwarding system also includes an aggregation tree of a depth corresponding to a length of information which is to become the matching key. A plurality of nodes branched from a root of the aggregation tree and levels of the nodes represent values of the matching key and mask lengths, respectively. A processing rule or the policy is registrable in each of the individual nodes. The packet forwarding system also includes a processing rule aggregation unit that registers the policy in the node of the aggregation tree corresponding to the matching key of the policy of the aggregation tree. The processing rule aggregation unit traces the aggregation tree down from its root based on the ad-hoc matching key determined by the policy management unit to search for and find a node beyond which there is no policy registered along a depth of the tree downwards. The processing rule aggregation unit forms the processing rule having the node of the aggregation tree thus found as the matching key. The processing rule aggregation unit registers the processing rule in the node of the aggregation tree thus found. The packet forwarding system also includes a processing rule memory that holds in store a processing rule formed by the processing rule aggregation unit. The packet forwarding system further includes a packet processor that executes registration of the processing rule in the processing rule memory in accordance with the registration of the processing rule by the processing rule aggregation unit in the aggregation tree. The packet processor executes packet processing by having reference to the processing rule stored in the processing rule memory.

A control device in a second aspect of the present invention includes a policy memory that holds in store a policy that prescribes processing contents and a matching key that identifies a packet to be applied with the processing contents. The control device also includes a policy management unit that refers to a policy in connection with a packet received to determine the processing contents and an ad-hoc matching key that identifies a packet to be applied with the processing contents. The control device also includes an aggregation tree of a depth corresponding to a length of the information which is to become the matching key. A plurality of nodes branched from a root of the aggregation tree and levels of the nodes represent the values of the matching key and mask lengths, respectively. A processing rule or the policy is registrable in each of the individual nodes. The control device also includes a processing rule aggregation unit that registers the policy in the node of the aggregation tree corresponding to the matching key of the policy. The processing rule aggregation unit traces the aggregation tree down from its root based on the ad-hoc matching key determined by the policy management unit to search for and find a node beyond which there is no policy registered along a depth of the tree downwards. The processing rule aggregation unit forms the processing rule having the node of the aggregation tree thus found as the matching key. The processing rule aggregation unit registers the processing rule in the node of the aggregation tree thus found. The control device also includes a processing rule memory that registers the processing rule formed by the processing rule aggregation unit. The control device further includes a packet processor that executes registration of the processing rule in the processing rule memory subject to registration of the processing rule by the processing rule aggregation unit in the aggregation tree. The packet processor executes packet processing by having reference to the processing rule stored in the processing rule memory.

A forwarding device in a third aspect of the present invention includes a processing rule memory connected to the control device and holding in store the processing rule formed by the control device. The forwarding device also includes a packet processor that executes registration of the processing rule in the processing rule memory subject to registration of the processing rule in the aggregation tree by the processing rule aggregation unit. The packet processor also refers to the processing rule stored in the processing rule memory to execute packet processing.

A method in a fourth aspect of the present invention is a method for forming a processing rule in a packet forwarding system. The packet forwarding system includes a memory that holds in store an aggregation tree of a depth corresponding to a length of the information which is to become a matching key of a policy that prescribes processing contents and the matching key. The matching key identifies the packet to apply the processing contents to. A plurality of nodes branched from a root of the aggregation tree and levels of the nodes represent the values of the matching key and mask lengths, respectively. A processing rule or the policy is registrable in each of the individual nodes. The method includes: registering the policy in the node of the aggregation tree corresponding to the matching key of the policy, referring to the policy in connection with a received packet to decide processing contents and an ad-hoc matching key to identify the packet to apply the processing contents to, and tracing the aggregation tree down from its root, based on the ad-hoc matching key, to search for and find the node beyond which there is no policy registered along the depth of the tree downwards, such as to form the processing rule having the node thus found as the matching key. The present method is bound up with a specified machine, viz., a packet forwarding system that processes an input packet in accordance with a processing rule that matches to the input packet.

A computer program in a fifth aspect of the present invention is to be run on a computer included in a packet forwarding system including a memory that holds in store an aggregation tree of a depth corresponding to a length of the information which is to become a matching key of a policy that prescribes processing contents and the matching key. The matching key identifies the packet to apply the processing contents to. A plurality of nodes branched from the root of the aggregation tree and levels of the nodes represent the values of the matching key and mask lengths, respectively. A processing rule or the policy is registrable in each of the individual nodes. The computer program allows a computer included in the packet forwarding system to execute the processing of registering the policy in the node of the aggregation tree corresponding to the matching key of the policy, the processing of referring to the policy in connection with a received packet to decide processing contents and an ad-hoc matching key that identifies the packet to apply the processing contents to, and the processing of tracing the aggregation tree down from the root, based on the ad-hoc matching key, to search for and find the node beyond which there is no policy registered along the depth of the tree downwards, such as to form the processing rule having the node thus found as the matching key. It is noted that the computer program may be recorded on a computer-readable recording medium. Viz., the present invention may be implemented as a computer program product.

The meritorious effects of the present invention are summarized as follows without Limitation.

According to the present invention, it becomes possible to reduce the number of processing rules (flow entries) maintained by a forwarding device. The reason is that the processing rules having shorter matching keys may be prepared, using the aggregation tree, under the condition that the matching key of the pre-existing policies will not be included. Under this condition, processing rules may subsequently be prepared.

PREFERRED MODES

Figure 1:
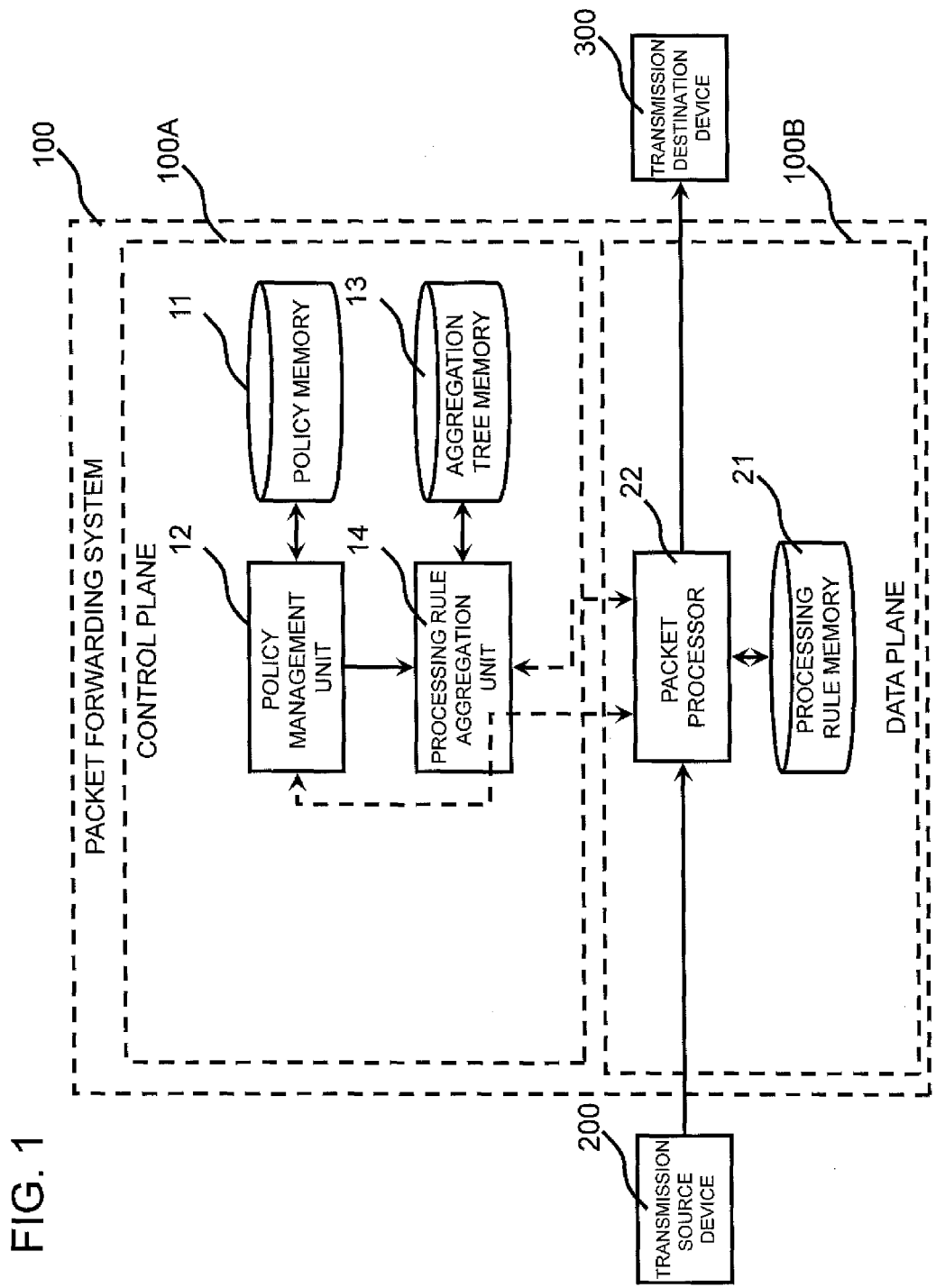
FIG. 1 is a schematic block diagram showing schemata of the present invention.

Initially, an exemplary embodiment of the present invention is shown. It is noted that numerals for reference to the drawings, appearing in the schemata, are merely for assisting in understanding and are not intended to limit the present invention to the modes shown in the drawings. The exemplary embodiment of the present invention may be applied to a packet forwarding system including a data plane 100B and a control plane 100A, as shown in FIG. 1. The data plane 100B includes a packet processor 22 that refers to a processing rule including a matching key matching to a received packet, out of a plurality of processing rules stored in a processing rule memory 21, such as to perform packet processing. The control plane 100A sets the processing rules to control the data plane 100B.

More specifically, the control plane 100A includes a policy memory 11 designed to store a plurality of policies each of which has prescribed processing contents and a matching key to identify a packet the processing contents are applied to. The control plane 100A also includes a policy management unit 12 that refers to the policies stored in the policy memory 11 to determine the processing contents to be applied to a received packet and an ad-hoc or temporary matching key to identify the packet the processing contents are applied to. The control plane 100A also includes an aggregation tree memory 13 designed to store an aggregation tree having a tree structure at whose nodes the policies stored in the policy memory 11 or the processing rules determined by the policy management unit 12 may be registered. The control plane 100A further includes a processing rule aggregation unit 14 that traces an aggregation along the depth of the tree downwards tree from its root to search for a node beyond which there is no node registering the policy, such as to prepare a processing rule that has the node as a matching key.

Figure 2:
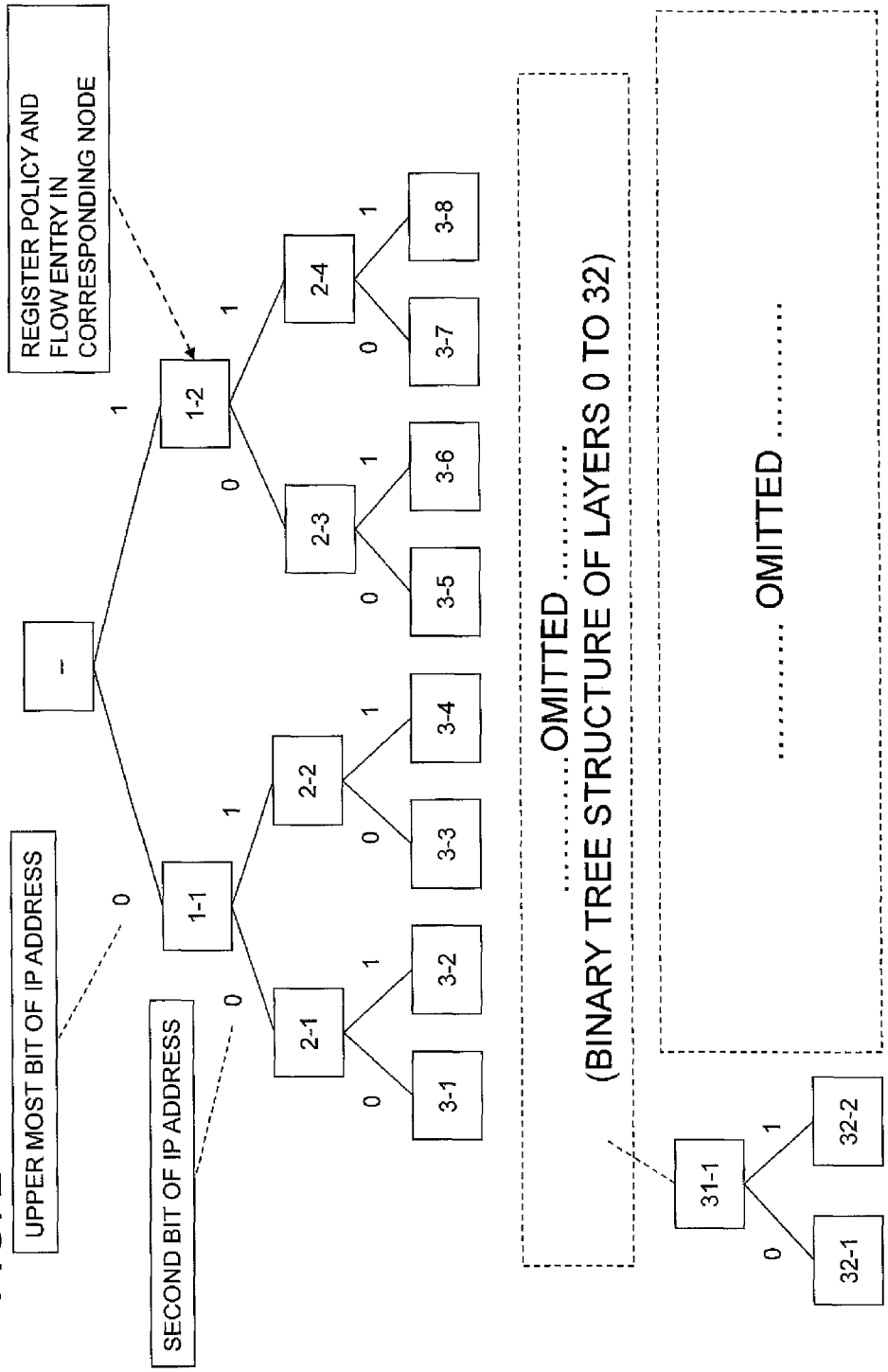
FIG. 2 is a schematic view showing an aggregation tree used in the present invention.

FIG. 2 schematically shows an aggregation tree used to aggregate an IP address of IPv4 (Internet Protocol Version 4) as a matching key. In this case, the aggregation tree is constructed as a binary tree (i.e., a tree of branching into 2 branches at every branching point) having a depth equal to a length of the IP address. The number of the levels of the node traced down from the root of the binary tree represents the mask length of the IP address used as the matching key. Each node represents the value of the matching key. For management, the processing rule or the policy is correlated with each node of such aggregation tree.

Using the above mentioned aggregation tree, the IP address, included in the processing rule, may be aggregated by the upper order bit mask to reduce the number of the flow entries. Specifically, arbitration with respect to pre-existing policies lying in the 'including' relationship may be done as follows:

It is now premised that an IP routing table having the following entries (policies) are stored in the policy memory 11, and that the entries (policies) are in need of the longest prefix match.

| policy ID | network address/mask | destination of transmission |
|---|---|---|
| 1 | 1.1.1.0/24 | Port0 |
| 2. | 1.1.0.0/16 | Port1 |

It is also premised that, in this state, an unknown packet, having a destination IP address of 1.1.2.1, be received. According to the longest Prefix Match, the unknown packet matches to the entry of the policy ID2. Hence, a processing rule with the processing contents that the packet is to be transmitted to the Port1 would be prepared.

If the network address/mask of '1.1.0.0/16' be used in an effort to reduce the length of the matching key of the processing rule, the packet of the flow which inherently should match to the policy ID1 would be unable to be transmitted to the proper destination. For example, a packet of 1.1.1.1 would be transmitted to Port1.

In the present invention, for example, is now assumed a state where a policy is stored in node 1-1 (with an upper bit of the matching key being 0) and another policy is stored in node 3-1 (with upper ordinate bits of the matching key being 000) in the above mentioned aggregation tree of FIG. 2. In this state, when a new received packet, with a matching key of '0011111 . . . ', is received, the processing rule aggregation unit 14 traces the nodes 1-1, 2-1, 3-2 and so forth, in this order, from the root of the aggregation tree, in accordance with the value of an ad-hoc matching key issued from the policy management unit 12. The processing rule aggregation unit sets a matching key corresponding to the node 3-2, as a matching key for the processing rule in question. It is noted that the node 3-2 is such a node beyond which downwardly along the depth of the tree there is no node(s) in which the policy is registered. Viz., the processing rule aggregation unit does not descend to further lower nodes. In this manner, after registering the pre-existing policies in nodes corresponding to the IP addresses in the aggregation tree, such node beyond which downwardly along the depth of the tree there is no node(s) registering the policy, viz., such node not 'including' the matching key of the pre-existing policy, is searched. It is thus possible to prepare a processing rule having a matching key of the necessary minimum length, as described above.

According to the present invention, the following modes are possible.

[Mode 1]

In Mode 1, there is provided the packet forwarding system according to the first aspect.

[Mode 2]

The packet forwarding system according to mode 1, wherein, the processing rule aggregation unit deletes the processing rule registered in a node which is a parent node for the node of the aggregation tree where the policy has newly been registered; the processing rule aggregation unit causing the packet processor to delete from the processing rule memory the processing rule deleted from the aggregation tree.

[Mode 3]

The packet forwarding system according to mode 1 or 2, wherein, if the processing rule is deleted by timeout from the processing rule memory, the packet processor informs the processing rule aggregation unit that the processing rule has been deleted;

the processing rule aggregation unit deleting the processing rule thus informed from the aggregation tree.

[Mode 4]

The packet forwarding system according to any one of modes 1 to 3, wherein, a control device that includes the policy memory, policy management unit, the control device forms the processing rule and distributes the so formed processing rule to each of a plurality of forwarding devices each of which is provided with the processing rule memory and the packet processor.

[Mode 5]

The packet forwarding system according to mode 4, wherein,
the control device does not include the policy management unit and includes a forwarding path forming unit that forms a packet forwarding path based on the configuration information of the forwarding devices and the network topology including the forwarding devices;
the control device causing the processing rule aggregation unit to input a matching key that implements the packet forwarding path formed by the forwarding path forming unit;
the control device distributing the processing rule to each of the forwarding devices.

[Mode 6]

The packet forwarding system according to mode 5, wherein,
the control device includes a traffic information collection unit that collects from the forwarding devices the traffic information recorded using the processing rule;
the forwarding path forming unit forming the packet forwarding path based on the traffic information collected.

[Mode 7]

The packet forwarding system according to any one of modes 1 to 6, wherein,
the matching key is one out of the destination IP address and the transmission source IP address.

[Mode 8]

In Mode 8, there is provided the control device according to the second aspect.

[Mode 9]

The control device according to mode 8, wherein,
the processing rule aggregation unit deletes the processing rule registered in the node corresponding to a parent node to the node of the aggregation tree where the policy has been registered; the processing rule aggregation unit causing the packet processor to delete from the processing rule memory the processing rule deleted from the aggregation tree.

[Mode 10]

In Mode 10, there is provided the forwarding device according to the third aspect.

[Mode 11]

In Mode 11, there is provided the method according to the fourth aspect.

[Mode 12]

In Mode 12, there is provided the computer program according to the fifth aspect.

[Exemplary Embodiment 1]

Figure 3:
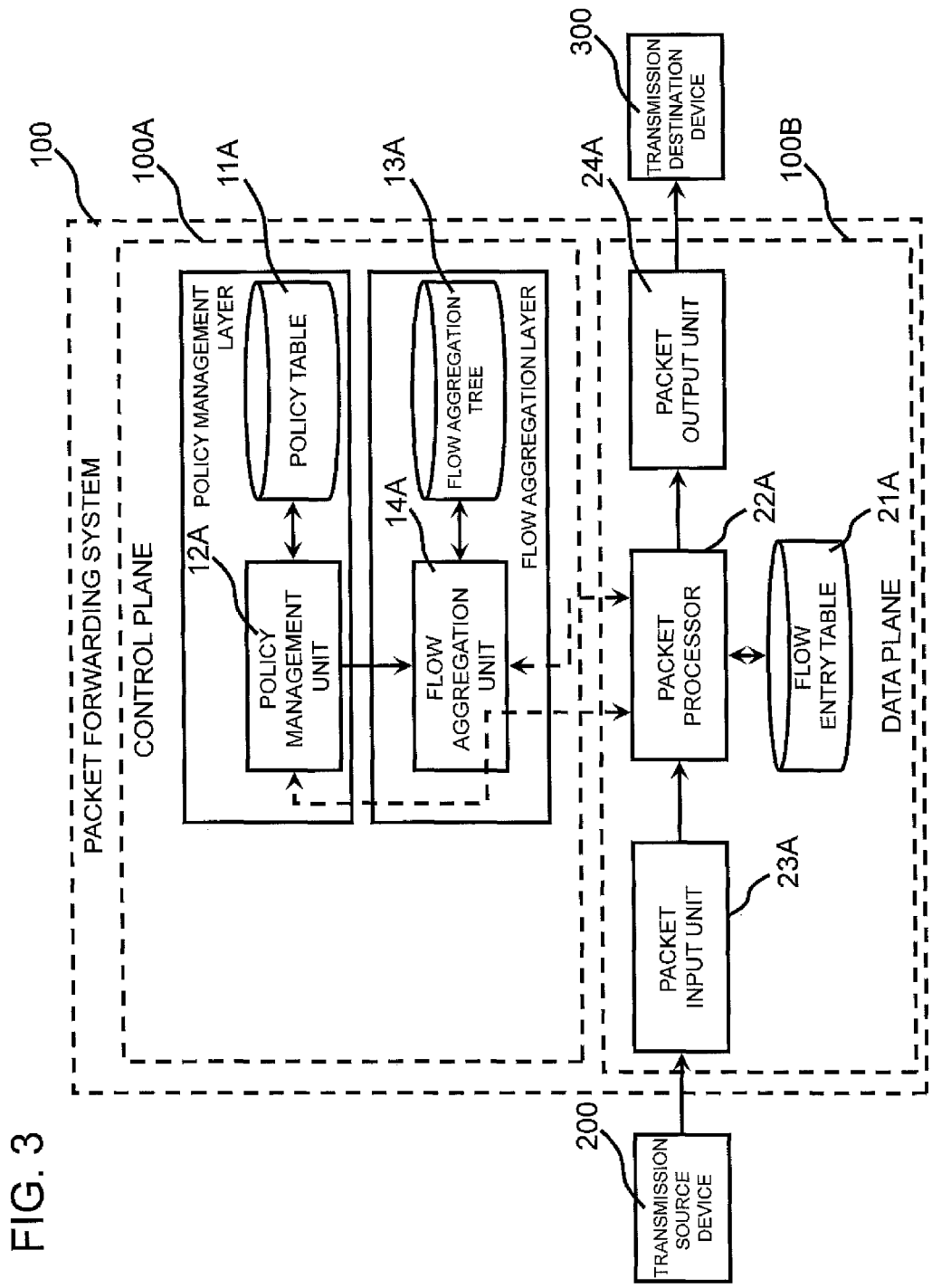
FIG. 3 is a schematic block diagram showing a configuration of exemplary embodiment 1 of the present invention.

Exemplary embodiment 1 of the present invention will now be described in detail with reference to the drawings. FIG. 3 depicts a block diagram showing the configuration of exemplary embodiment 1 according to the present invention.

Referring to FIG. 3, a packet forwarding system 100 according to exemplary embodiment 1 of the present invention includes a control plane 100A that manages flows and a data plane 100B that forwards packets. The packet forwarding system forwards packets transmitted from a transmission source device 200 to a transmission destination device 300. This sort of the packet forwarding system may be implemented by a flow base switch(es) that e.g., forwards packets on the flow-by-flow basis.

The data plane 100B includes a flow entry table 21A, a packet processor 22A, a packet input unit 23A and a packet output unit 24A.

The packet input unit 23A is a port connected to the transmission source device 200 and represents a flow ingress point to the system. The packet output unit 24A is a port connected to the transmission source device 200 and represents a flow egress point from the system. It is noted that, in FIG. 3, just one packet input unit 23A and just one packet output unit 24A are shown. It is however premised that there are provided a plurality of packet inlet units and a plurality of packet outlet units, and that these packet inlet and outlet units are connected to respective different transmission source and transmission destination devices.

The flow entry table 21A is equivalent to the above mentioned processing rule memory 21, and is a table in which flow entries (processing rules) are stored. In each of these flow entries, a matching key to identify a flow and packet processing contents are stored correlated with each other. In each flow entry, the valid time (life time) is set. If no packet matched to the flow entry is received during the valid time, the packet processor 22A regards that the flow in question has come to a close (timed out). The packet processor then deletes the flow entry in question. For such arrangement, the same scheme as that used in the open flow switches of the Non-Patent Documents 1, 2 may be used.

The packet processor 22A refers to the flow entry table 21A to find out a flow entry that matches to the received packet to carry out processing determined as the packet processing contents in the so found out flow entry. This processing may, for example, be forwarding, discarding or packet header rewrite of packets from the packet output unit specified from among the multiple packet output units. If there is no flow entry matched to the received packet in the flow entry table 21A, the packet processor 22A requests a policy management unit 12A to prepare a flow entry matched to the received packet. In response to the instructions from the control plane 100A, the packet processor 22A registers the new flow entry in the flow entry table 21A. If no packet matched to the flow entry is received during the time as specified by the valid time, the packet processor 22A deletes the flow entry and informs a flow aggregation unit 14A about the so deleted flow entry.

By a start packet in each flow (packet not having a matched entry) being informed to the policy management unit 12A, and by the flow entry for such packet being prepared and registered in the flow entry table 21A, the packet and subsequent packet(s) following the start packet in the same flow may now be forwarded.

The control plane 100A includes a policy management layer in turn including a policy table 11A equivalent to the policy memory 11 of FIG. 1 and the policy management unit 12A. The control plane 100A also includes a flow aggregation layer in turn including a flow aggregation tree 13A equivalent to the aggregation tree memory 13 of FIG. 1 and the flow aggregation unit 14A equivalent to the processing rule aggregation unit 14 of FIG. 1.

The policy table 11A is a table in which there is set the information to determine the processing contents, such as packet forwarding destination, based on the contents of the packet the preparation of the flow entry of which has been requested by the packet processor 22A. For example, a routing table, maintained by a router or by a switch, is typical of the policy table 11A.

The policy management unit 12A has a function to manage the policies registered in the policy table 11A, and a function to communicate contents of a change in the policy table 11A to the flow aggregation layer, if such change has occurred. In addition, if requested by the packet processor 22A to prepare a flow entry for an unknown packet, the policy management unit 12A refers to the policy table 11A to inform the flow aggregation unit 14A about processing contents, such as packet forwarding destination, and the ad-hoc matching key of the unknown packet.

The flow aggregation tree 13A is a binary tree of a depth corresponding to the information which is to be the matching key for the packet. The tree is capable of registering the policies registered in the policy table 11A and the flow entries registered in the flow entry table 21A in association with respective node of the tree.

Figure 4:
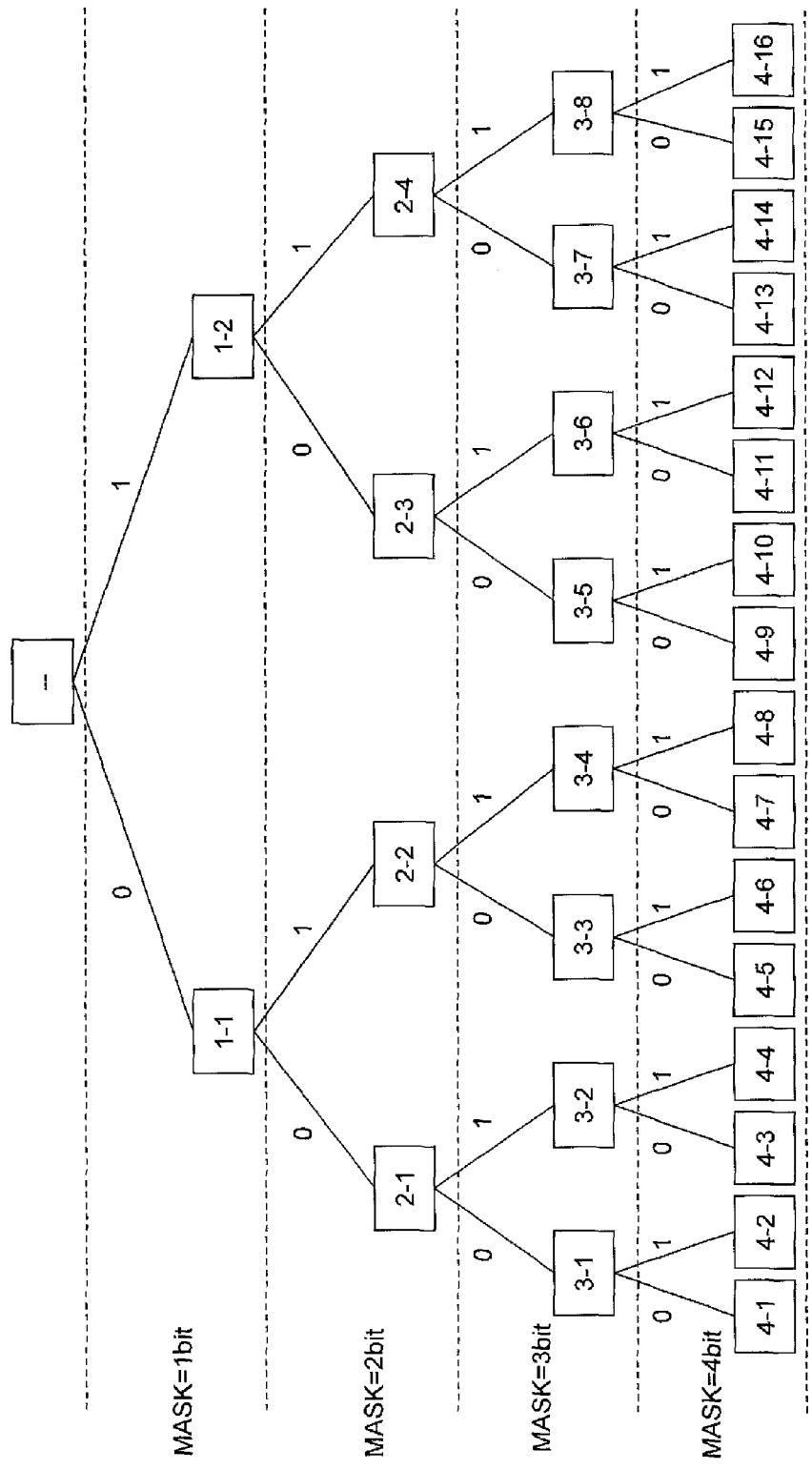
FIG. 4 is a schematic view showing a configuration of a simplified aggregation tree used for explanation of the operation of exemplary embodiment 1 of the present invention.

In the present exemplary embodiment, to simplify the explanation, such a flow aggregation tree of a depth equal to 4, with each layer of the tree representing a mask length, as shown in FIG. 4, is used. It is assumed that the flow aggregation tree branches with '0' or '1', in order, beginning from the upper ordinate bit towards the lower ordinate layers. The sequence of this branching operation is performed repeatedly towards the lower level. The management of the policies and flow entries, performed with the aid of the flow aggregation tree, will be explained in detail subsequently with reference to FIGS. 5 to 11.

The flow aggregation unit 14A registers a policy at a location corresponding to the matching key of the policy as communicated from the policy management unit 12A of the flow aggregation tree 13A. Moreover, the flow aggregation unit 14A decides in which node of the flow aggregation tree 13A the flow entry, whose ad-hoc matching key has been decided by the policy management unit 12A, is to be registered. The flow aggregation unit thus decides the flow entry to be registered in the flow entry table 21A and accordingly instructs the packet processor 22A to make the registration in the flow entry table 21A. In addition, if informed by the packet processor 22A that a flow entry has become extinct from the flow entry table 21A, the flow aggregation unit 14A deletes the corresponding flow entry from the flow aggregation tree 13A. Viz., in the flow aggregation tree 13A, the flow entries are registered or deleted in the same way as the flow entries registered in the flow entry table 21A.

The various components (processing means) of the packet forwarding system 100, shown in FIG. 1, may be implemented by a computer program which allows a computer making up the packet forwarding system 100 to execute the above mentioned processing operations using the computer's hardware.

The operation of the present exemplary embodiment will now be described in detail with reference to the drawings. The following description will be made under an item 'the policy registration' and under an item 'the flow entry registration', in this order.

[Policy Registration]

Figure 5:
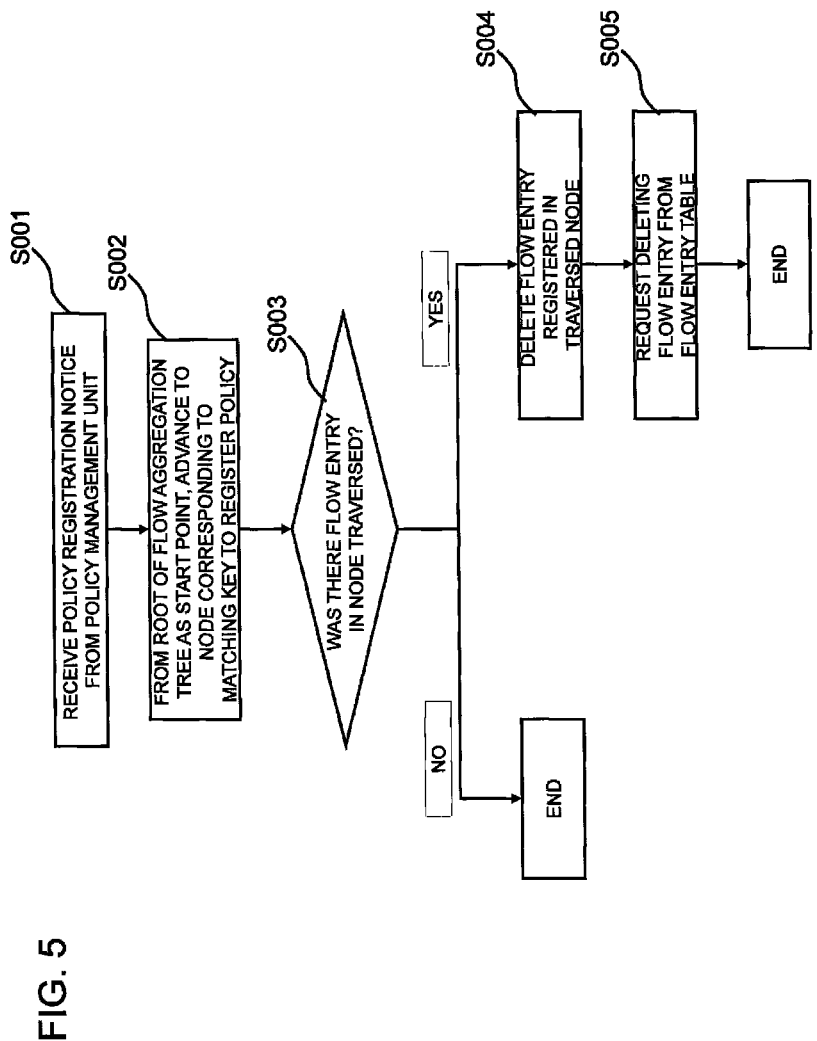
FIG. 5 is a flowchart showing the flow of processing of policy registration for the aggregation tree of FIG. 4 in the exemplary embodiment 1 of the present invention.

FIG. 5 depicts a flowchart showing a flow of registration of policies in the flow aggregation unit 14A. The policy management unit 12A informs the flow aggregation unit 14A about the contents of a policy registered in the policy table 11A, as explained previously (step S001). With the root of the flow aggregation tree 13A, as a start point, the flow aggregation unit 14A advances to a node corresponding to the matching key of the policy. The flow aggregation unit registers the policy at this node (step S002). As regards the policy, the matching key and the entire of the information used are notified. For example, if the contents are an IP address, the information down to the mask length is notified. Relevant contents are then registered at relevant locations in the flow aggregation tree 13A.

The flow aggregation unit 14A then checks to see whether or not there existed any flow entry in the node(s) traversed (step S003). If the result of check indicates that there existed no flow entry in the node(s) traversed, the processing for policy registration comes to a close.

If there existed any flow entry in the node(s) traversed, the flow aggregation unit 14A deletes the flow entry from the flow aggregation tree 13A (step S004), while requesting the packet processor 22A to delete the flow entry, thus deleted, from the flow entry table 21A as well (step S005). By placing priority on the policies in this manner, it is possible to annul the state of contention (conflict) with the flow entries which will be subsequently prepared and registered. Note that, as regards the flow entry deleted from the flow entry table 21A, the policy management unit 12A is requested to prepare the flow entry as an unknown packet at the time of reception of the next packet.

[Registration of Flow Entry]

Figure 6:
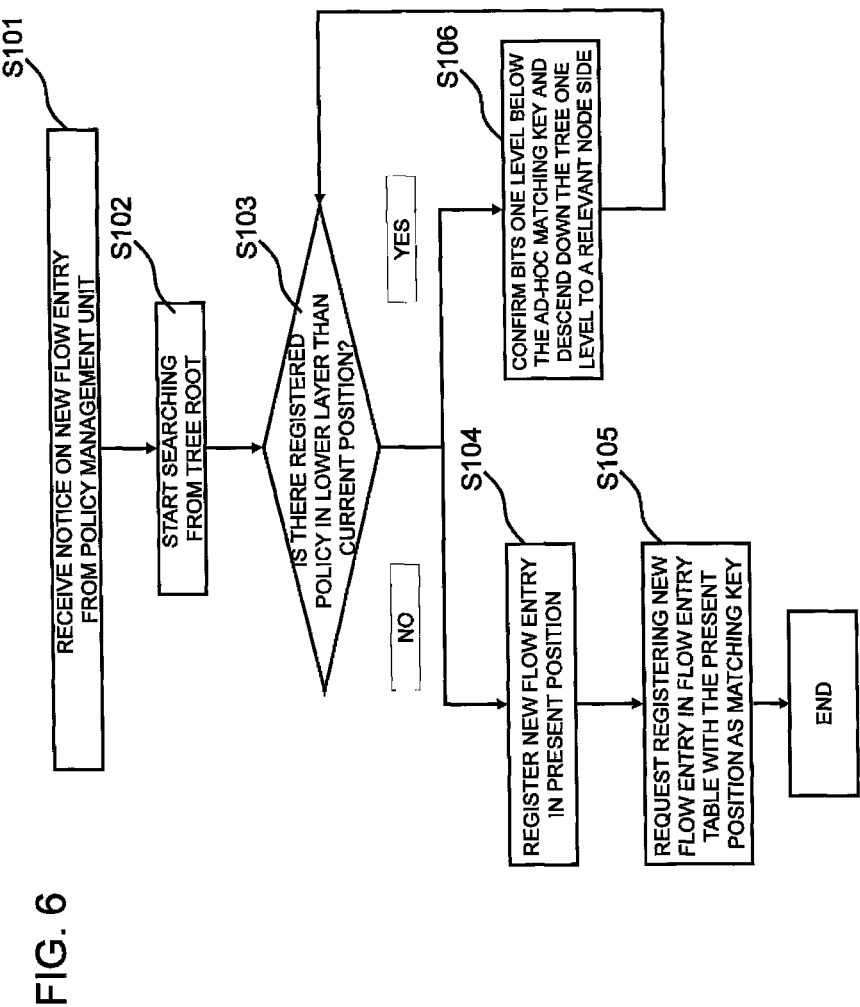
FIG. 6 is a flowchart showing the flow of processing of registration of a new flow entry to the aggregation tree of FIG. 4 in the exemplary embodiment 1 of the present invention.

FIG. 6 depicts a flowchart showing the flow of registration of a flow entry in the flow aggregation unit 14A. The policy management unit 12A prepares a flow entry by having reference to the policy table 11A in response to a request for preparation of the flow entry, as previously explained. The policy management unit informs the flow aggregation unit 14A about the contents of the so prepared flow entry (step S101). Then, with the root of the flow aggregation tree 13A as a start point, the flow aggregation unit 14A commences searching for a node matched to the information used as a matching key (step S102).

Initially, the flow aggregation unit 14A checks to see if there should exist a policy in a layer lower than the layer of the current position (step S103). If there should exist a policy in the layer lower than the layer of the current position, it is necessary to annul the state of contention with the policy. Hence, the flow aggregation unit 14A checks the bit of the matching key lower by one place than the current bit, and descends along the flow aggregation tree 13A towards a relevant node side. The operation of checking and descending is carried out repeatedly (step S106).

It is assumed that, as a result of tracing down the flow aggregation tree 13A towards the low-level side, a decision has been given that there is no policy on the lower layer side than the current position (NO of step S103). The flow aggregation unit 14A then registers the new flow entry, as informed from the policy management unit 12A, at the current position (node at the time point of the above decision) (step S104). At the same time, the flow aggregation unit 14A requests the packet processor 22A to register in the flow entry table 21A the new flow entry whose matching key is the above mentioned node position (step S105). By descending along the flow aggregation tree 13A from its root level-by-level until it is confirmed that no policy exists in a layer(s) lower in level than the current position, it is possible to obtain the matching key that does not conflict with the other pre-existing policies and that is of a shortest length.

Figure 7:
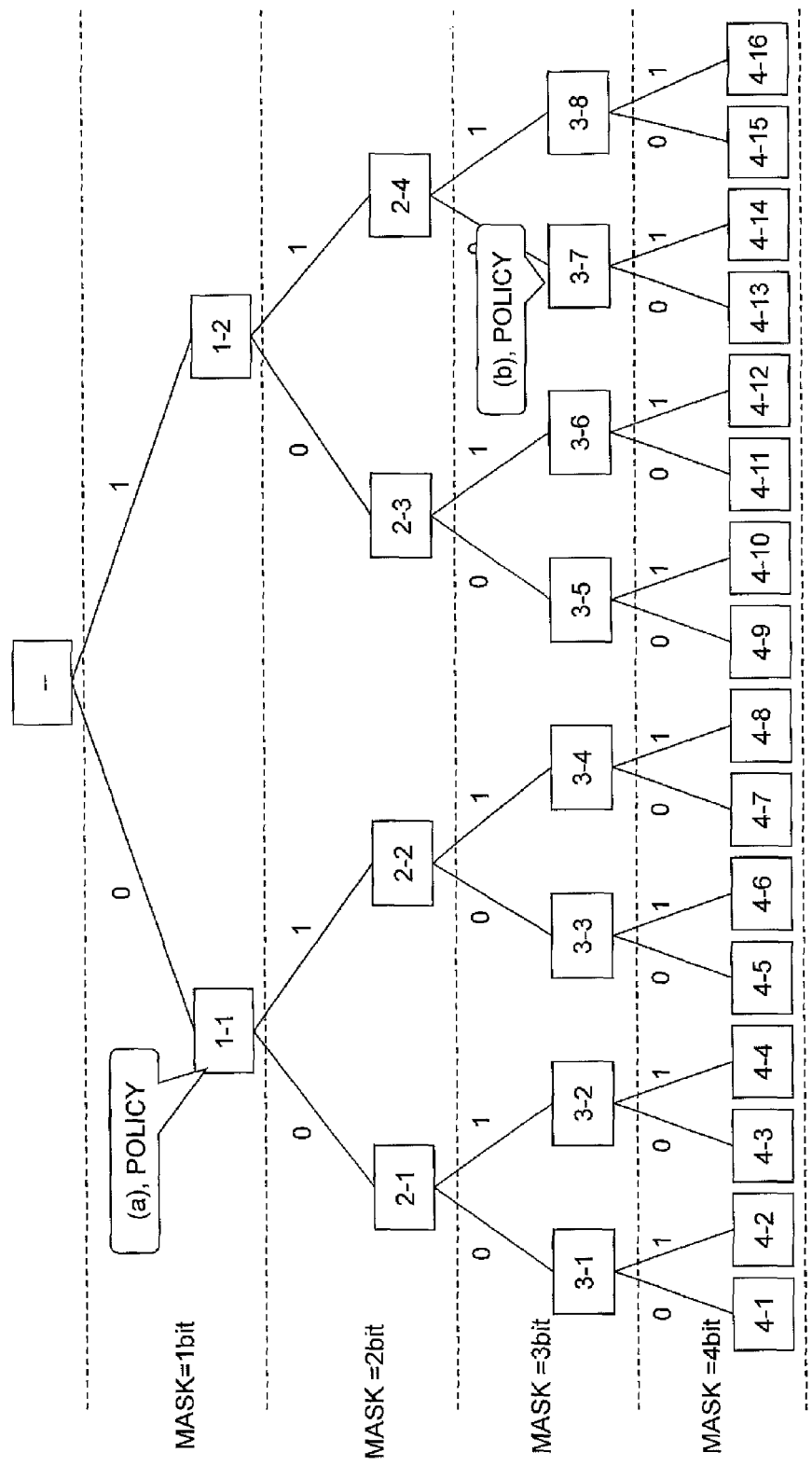
FIG. 7 is a schematic view for illustrating the operation of the exemplary embodiment 1 of the present invention step-by-step.

FIGS. 7 through to 11 illustrate the process of registration of new policies and new flow entries in the flow aggregation tree 13A shown in FIG. 4. In the following explanation, a 4-bit destination address with a network mask (X.X.X.X/Y, Y being a network mask length), is used as a matching key of the policy registered in the policy table and as a matching key of the flow entry registered in the flow entry table. It is noted that the matching key can be associated with branches of each level, and that, however, the matching key is not to be associated with the upper most branch representing the root of the flow aggregation tree.

It is now assumed that the initial state is such a state where no flow entry has been registered in the flow aggregation tree 13A shown in FIG. 4, and that, similarly, no flow entry has been registered in the flow entry table 21A.

It is also assumed that, beginning from the above state, the following two policies have been registered in the policy table 11A: (a) destination address=0.0.0.0/1, processing contents=A (forwarded from a port A) (b) destination address=1.1.0.0/3, processing contents=B (forwarded from a port B)

At the time the policy is to be registered in the policy table 11A, notification is made to the flow aggregation unit 14A in a state where the address has been specified down to the network mask. The flow aggregation unit 14A descends from the upper most level of the flow aggregation tree 13A to the layer of the network mask specified to search for a policy registration position to register the policy.

FIG. 7 shows a state where the policies (a), (b) have been registered. The policy (a) is registered in node 1-1, while the policy (b) is registered in node 3-7.

It is assumed that the following packet:
destination address=0.1.1.0
is received by the packet processor 22A.
At this time point, no corresponding flow entry has been registered in the flow entry table 21A. The packet processor 22A thus requests the policy management unit 12A to prepare a flow entry corresponding to the unknown packet.

The policy management unit 12A, which has received the request to prepare the flow entry, refers to the policy table 11A to search for the policy corresponding to the destination address=0.1.1.0. Since the policy (a) meets this condition, the policy management unit 12A informs that a flow entry, whose processing contents are A (as forwarded from the port A), and whose ad-hoc matching key is the destination address=0.1.1.0, has been prepared for the packet with the destination address=0.1.1.0.

The flow aggregation unit 14A descends along the flow aggregation tree of FIG. 7 level-by-level from the upper most level in accordance with the flowchart of FIG. 6. At the node position 1-1, the flow aggregation unit gives a decision that no policy has been registered at a level lower than this current position, as shown in FIG. 8.

At this time, the matching key of the flow entry, which the flow aggregation unit 14A causes the packet processor 22A to register in the flow entry table 21A, has (c) the destination address=0.0.0. 0/1. This destination address is combined with the processing contents=A, forwarded from the port A, to form a set, which is then registered in the flow entry table 21A.

Figure 8:
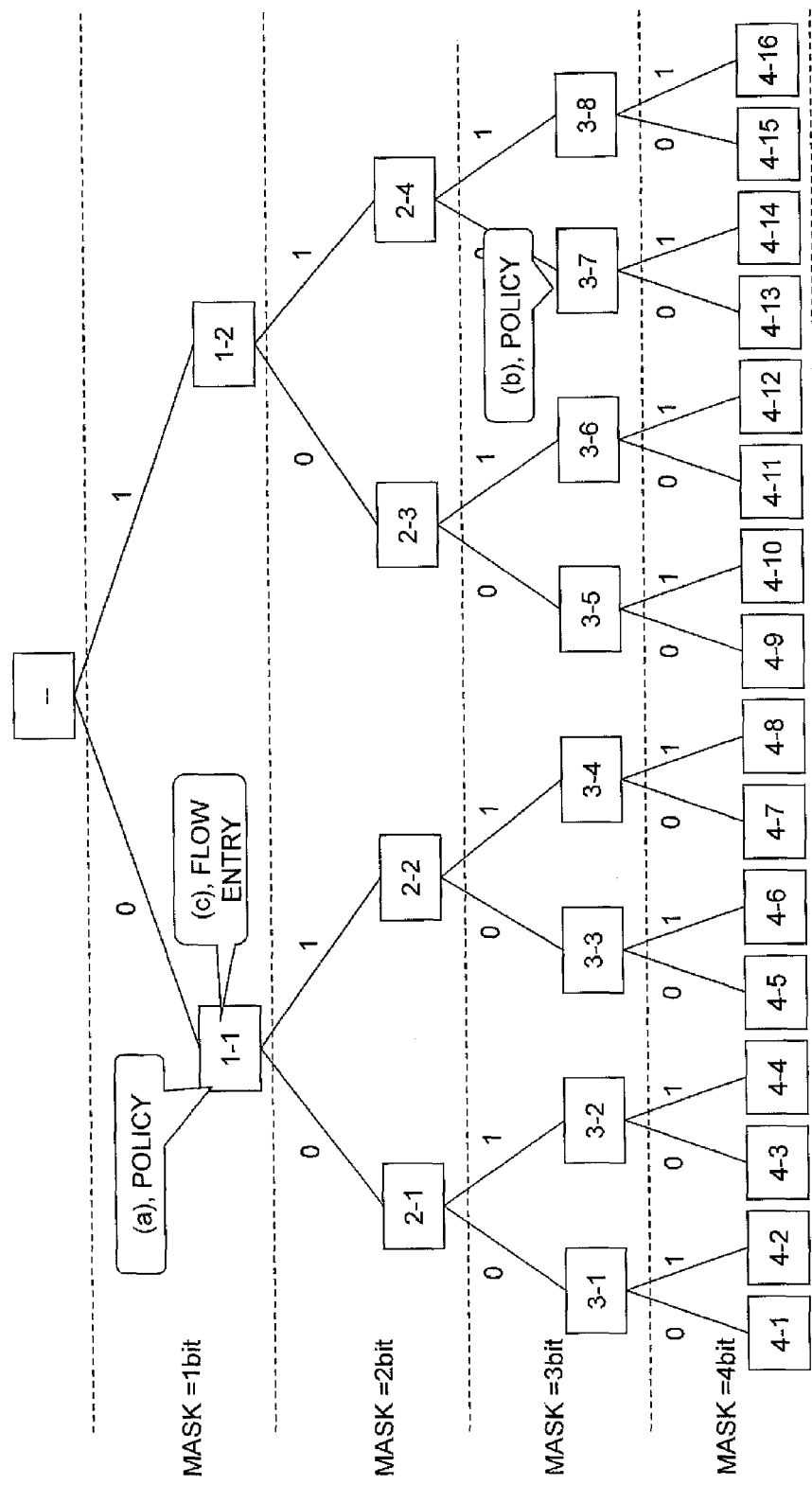
FIG. 8 is a schematic view similar to and continuing from FIG. 7.
Figure 9:
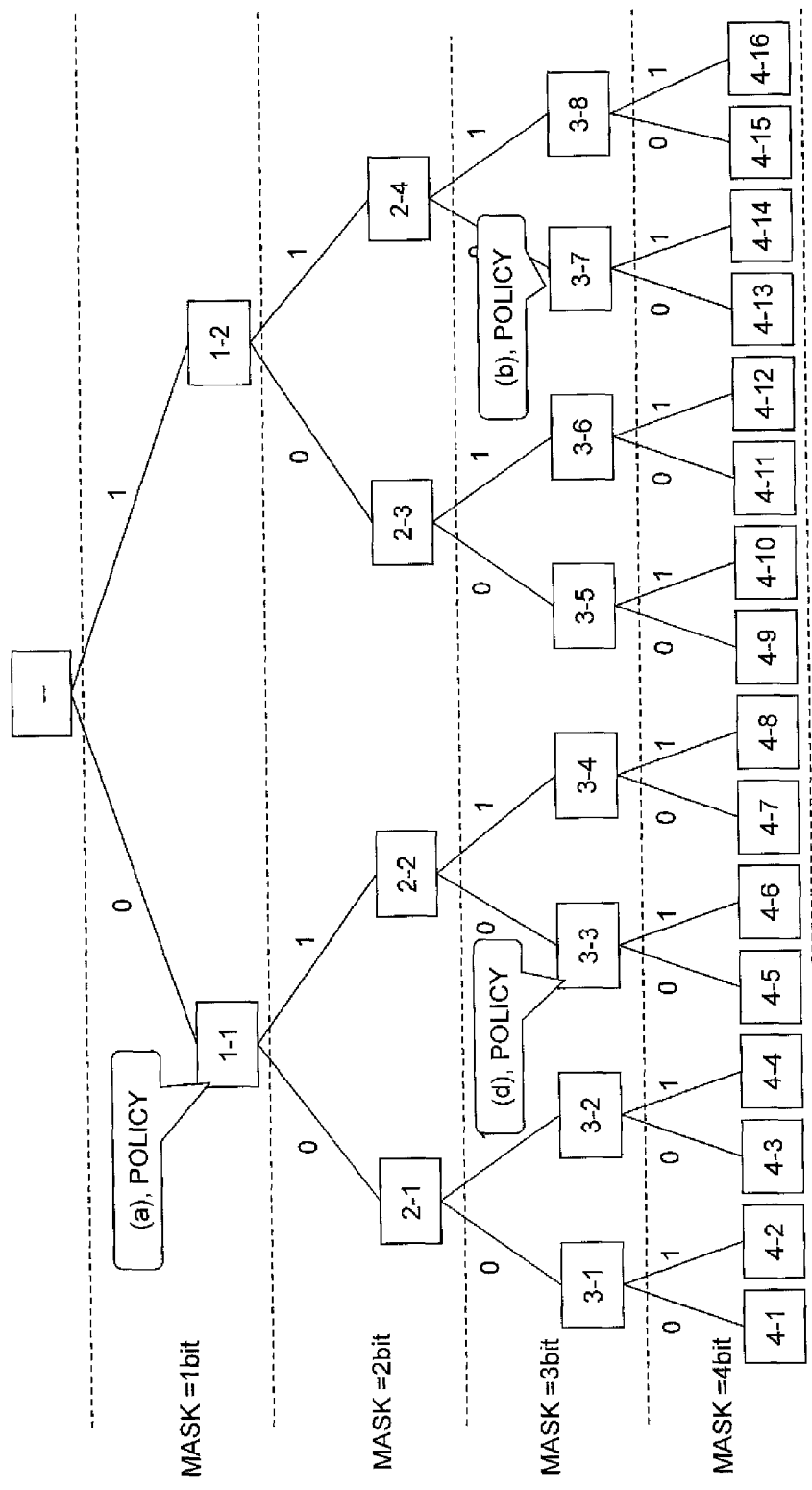
FIG. 9 is a schematic view similar to and continuing from FIG. 8.
Figure 10:
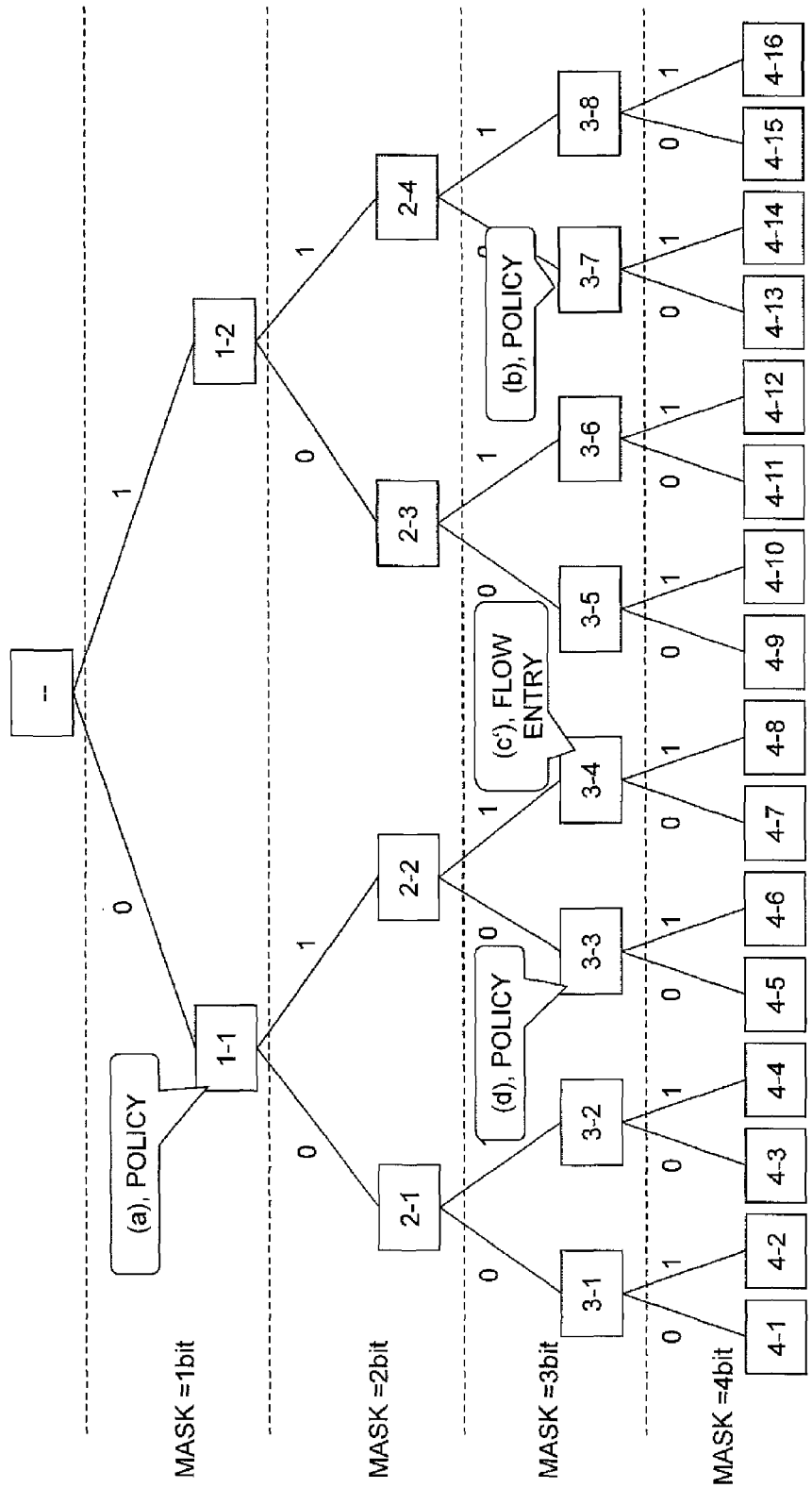
FIG. 10 is a schematic view similar to and continuing from FIG. 9.

The flow entry, thus prepared, is registered in the corresponding node of the flow aggregation tree as well (see FIG. 8).

It is assumed that, from the above state, the following policy:
(d) destination address=0.1.0.0/3, processing contents=A (forwarded from the port A)
has been registered in the policy table 11A.

The flow aggregation unit 14A descends to the layer of the network mask specified, from the upper most position of the flow aggregation tree 13A, in accordance with the flowchart of FIG. 4, in the same way as when dealing with the policies (a) and (b), to search for and find out a policy registration position. The flow aggregation unit then registers the policy at the registration position thus found out.

The policy (d) is registered via the route of node 1-1, node 2-2 and node 3-3. In node 1-1, the flow entry (c) has been registered. Thus, in step S004 of FIG. 5, the flow aggregation unit 14A deletes the flow (c) from the flow aggregation tree, while requesting the packet processor 22A to delete the flow entry (c) from the flow entry table 21A. It is because the matching key of the policy (d) conflicts with, that is, is 'included' in, the matching key of the flow entry (c). Thus, if the flow entry (c) should remain registered in the flow entry table 21A, the packet processor would subsequently be unable to discriminate the flow entry prepared based on the policy (d) from the flow entry (c).

As a result, the policy (d) is registered in the node 3-3, and the flow entry (c) is deleted from the node 1-1 which is its parent node.

If now a packet with a destination address of 0.1.1.0, which should have matched to the flow entry (c), is received, the packet processor 22A again requests the policy management unit 12A to prepare a flow entry. Thus, the flow entry is prepared by the same processing as that performed in registering the flow entry (c).

However, at this time point, the policy (d) has already been registered, as described above. The flow aggregation unit thus descends, without stopping at node 1-1, to the position of node 3-4, shown in FIG. 10. At this position, the flow aggregation unit gives a decision that no policy has been registered beyond this position downwards along the depth of the flow aggregation tree.

At this time, the matching key of the flow entry, which the flow aggregation unit 14A causes the packet processor 22A to register in the flow entry table 21A, corresponds to the location of node 3-4, with the (c') destination address=0.1.1.0/3. Hence, a flow entry, having the matching key being the destination address=0.1.1.013 and having the processing contents being A (forwarded from the port A), is registered in the flow entry table 21A.

It is assumed that the packet processor 22A then has further received the following packet:
(e) destination address=0.0.1.1.

In this case, as in the cases of the flow entries (c) or (c'), search is made towards the lower layer side, based on the policy (a), for such a node 2-1 beyond which there are no nodes where the policy is registered along the depth of the tree downwards. For such case, the matching key of the flow entry corresponds to the location of the above mentioned node 2-1, and is (e) a destination address=0.0.0.0/2, Hence, a flow entry, having a matching key as a destination address=0.0.0.0/2 and processing contents are A as forwarded from the port A, is registered in the flow entry table 21A.

Figure 11:
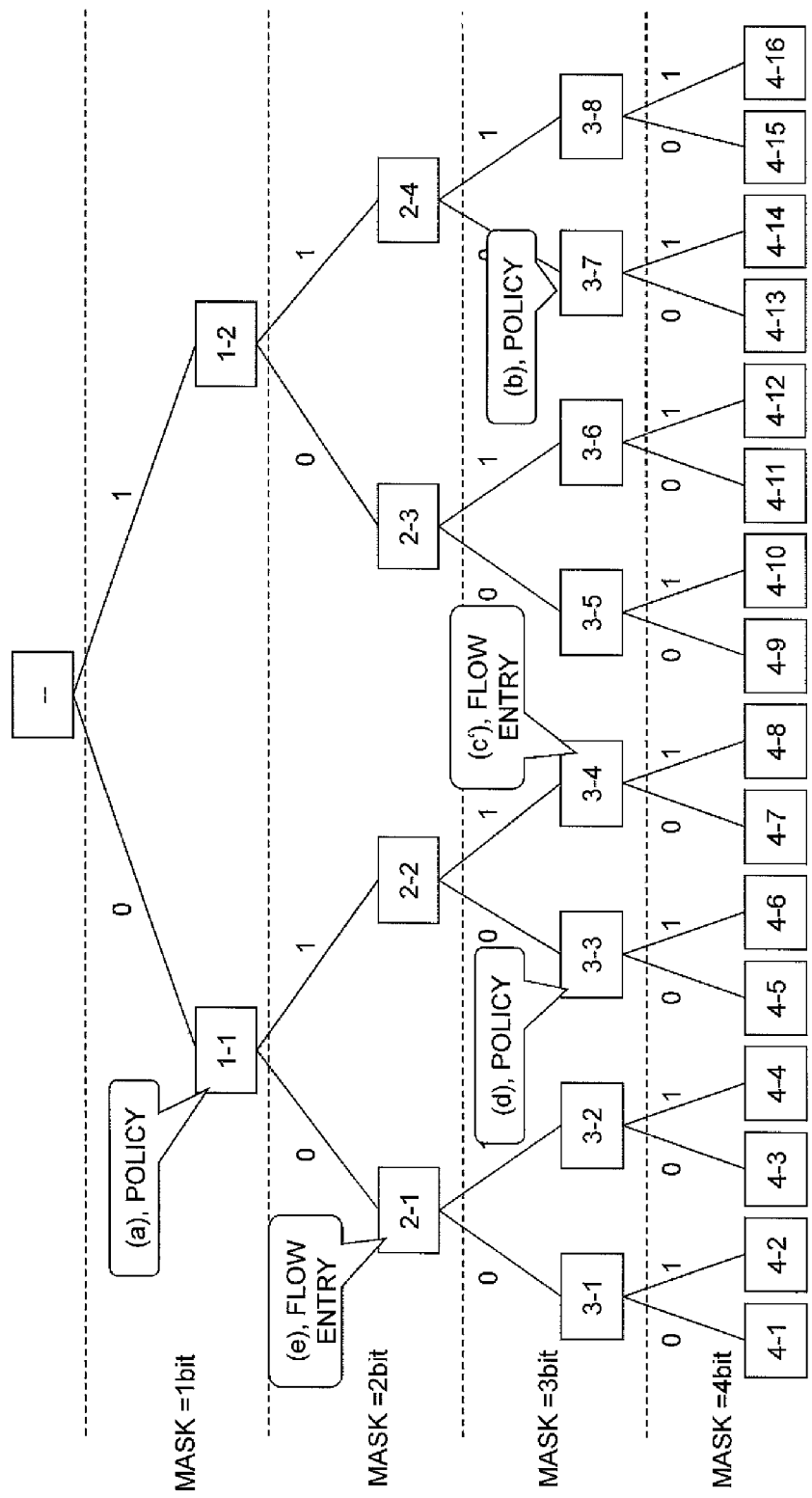
FIG. 11 is a schematic view similar to and continuing from FIG. 10.

As a result, the flow entry (e) is registered in the node 2-1, as shown in FIG. 11.

It is thus possible to reduce the mask length of the masking key of the flow entry to be registered and to suppress the number of the registered flow entries from increasing. The reason is that the flow aggregation tree is traced down to search for and find out a node beyond which there is no policy along the depth of the tree downwards. Then, a flow entry, having the node as the matching key, is registered. By so doing, logically the entire of the flow entries may be aggregated in a form not having the 'including' relationship with respect to the policy.

Moreover, in the present exemplary embodiment, the flow entry registered in a node corresponding to the parent node on the flow aggregation tree is deleted at the time of registration of a new policy. Viz., the flow entry having a mask length shorter than is necessary is deleted and subsequently set a second time.

In addition, in the present exemplary embodiment, the number of flow entries, registered in the flow entry table, is decreased to a necessary minimum number. It is because the flow entries are deleted from time to time.

[Exemplary Embodiment 2]

Figure 12:
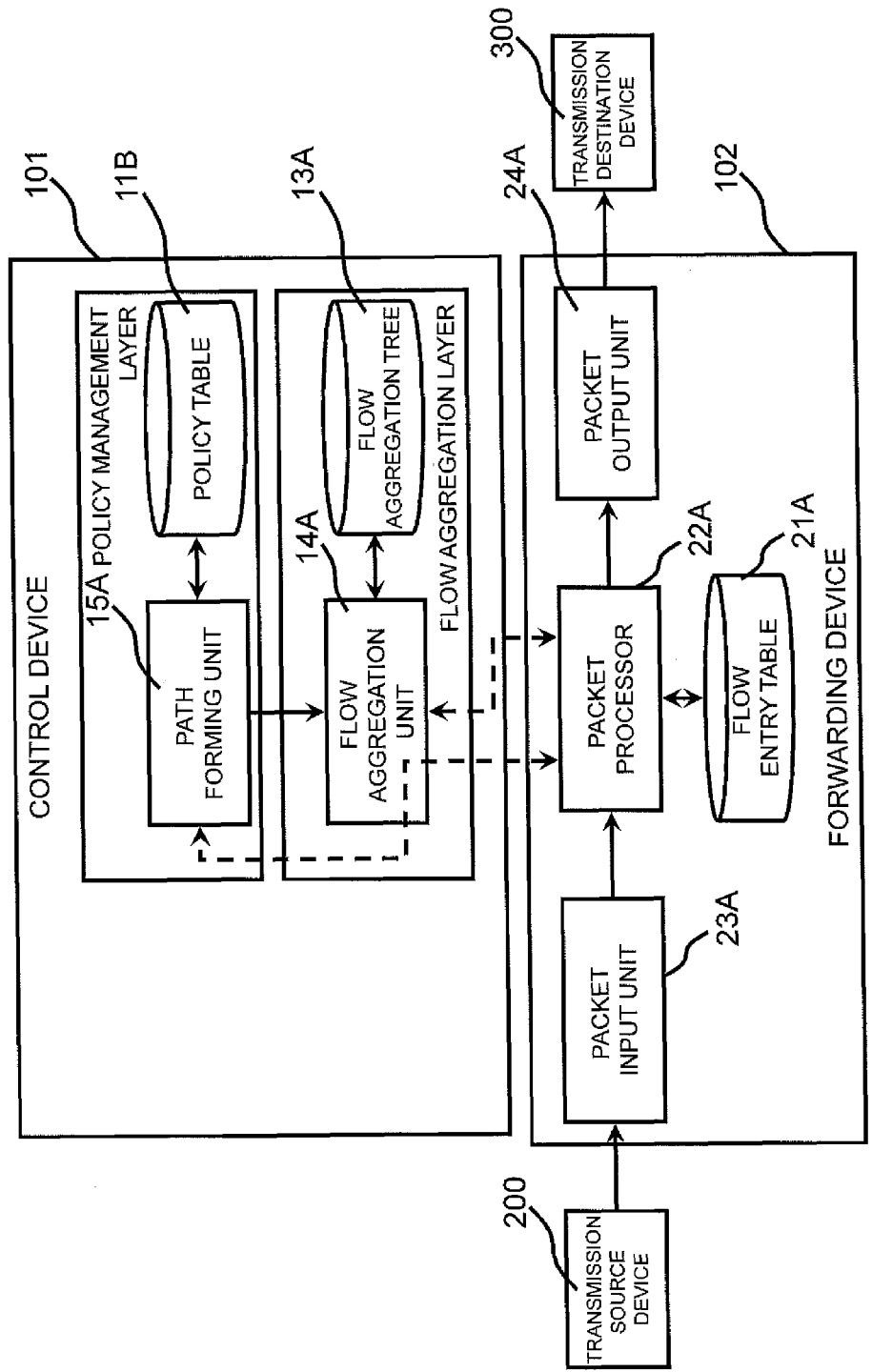
FIG. 12 is a schematic block diagram showing a configuration of exemplary embodiment 2 of the present invention.
Figure 13:
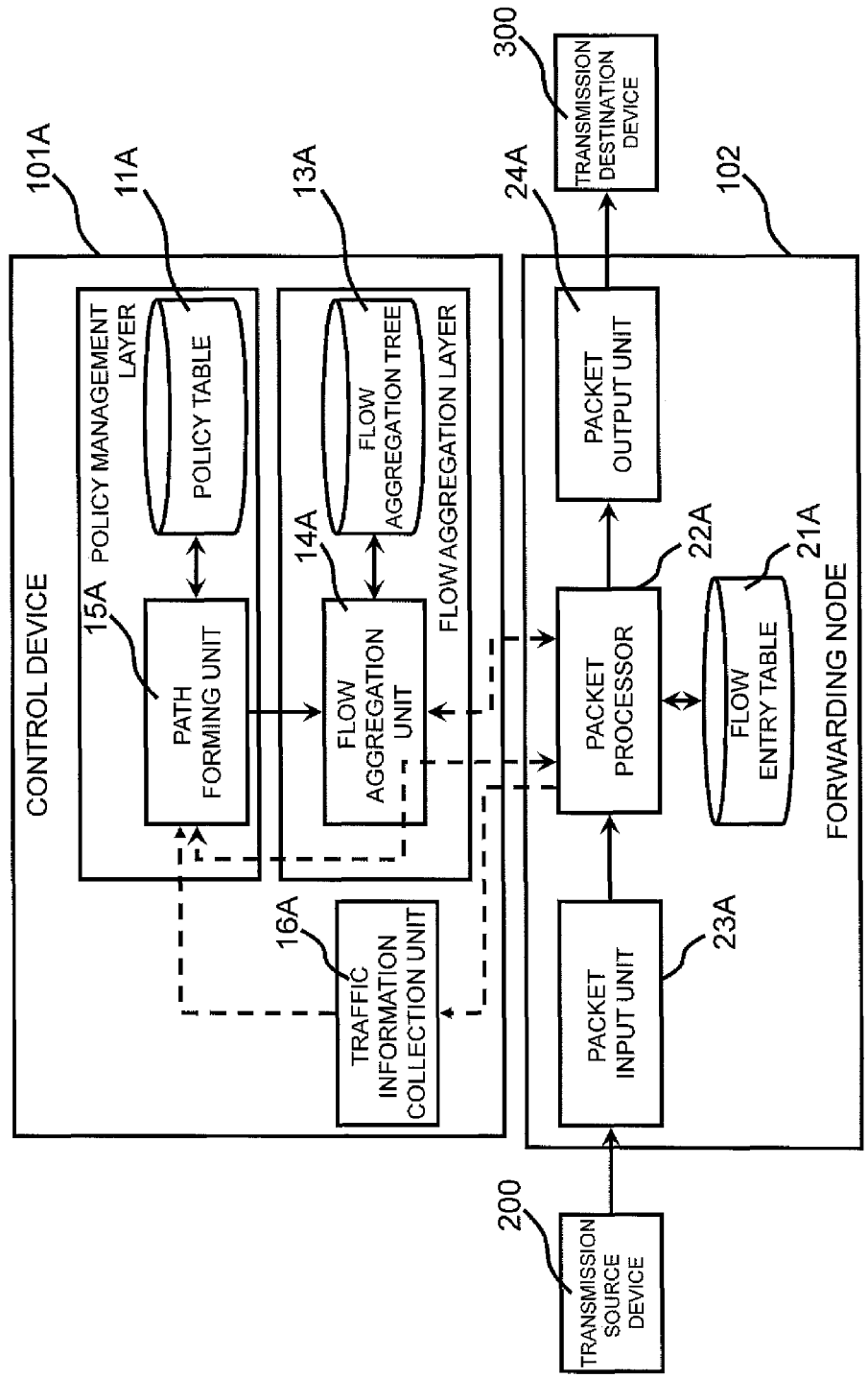
FIG. 13 is a schematic block diagram showing a configuration of exemplary embodiment 3 of the present invention.

An exemplary embodiment 2 in which the present invention is applied to the open flow switch and the open flow controller of the Non-Patent Documents 1 and 2 will now be described. FIG. 12 shows a configuration of the exemplary embodiment 2 of the present invention.

The point of difference of the present exemplary embodiment from the above described exemplary embodiment 1 is that the control plane 100A of the exemplary embodiment 1 becomes a control device 101 having a path forming unit 15A and that the data, plane 100B of the exemplary embodiment 1 becomes a forwarding device 102. Although the single forwarding device 102 is shown in FIG. 12, a plurality of forwarding devices prepare and distribute flow entries for processing the individual received packets under control by the controller 101. Otherwise, the configurations of the various components are similar to those of the exemplary embodiment 1.

In the present exemplary embodiment, the path forming unit 15A forms a forwarding path for the packet received from the open flow switch, based on a network topology, provided preliminarily, or on the configuration information for each forwarding device, not shown, such as to form flow entries that implement the path. The so formed flow entries are registered as a policy in the policy table 11B, while the corresponding information is notified to the flow aggregation unit 14A. The next following operations are similar to those of the above described exemplary embodiment 1. Viz., the flow entry, registered in the node which becomes a parent node to the node where the new policy (new flow entry) has been registered, is deleted by the processing of FIG. 5 which uses the flow aggregation tree 13A. The forwarding device 102 is also instructed to make corresponding deletion. In similar manner, the new policy (new flow entry) is issued to the forwarding device 102 as a flow entry having a proper wildcard by the processing of FIG. 5 which uses the flow aggregation tree 13A. As may be seen from the foregoing, the present invention may be applied to a configuration in which, like the open flow switch and the open flow controller of Non-Patent Documents 1 and 2, the control device controls larger numbers of forwarding devices to control the packet forwarding path(s).

Although the description has been made of preferred exemplary embodiments of the present invention, such exemplary embodiments are given only by way of illustration and are not intended to limit the scope of the present invention. Viz., further modifications, substitutions or adjustments may be made without departing from the basic technical concept of the present invention.

For example, the control device 101A may be provided with a traffic information collection unit 16A configured for collecting the traffic information which the forwarding device 102 records with the aid of the flow entry. In this case, the path forming unit 15A is able to form a path which takes account not of the shortest hop as calculated from the network topology but of the traffic state as collected from the traffic information collection unit 16A.

In the above described exemplary embodiments, the destination address is used as the matching key. It is however also possible to use the transmission source address or both the destination address and the transmission source address as the matching key. The present invention may naturally be applied not only to the IPv4 address but also to the IPv6 address.

In the foregoing description of the exemplary embodiments, it is assumed that packets are sent from the transmission source device 200 to the transmission destination device 300. The present invention may also be applied to the flow in the reverse direction, in which case it is similarly possible to aggregate the processing rules (flow entries) of the flow in the reverse direction.

The present invention may also be applied to such a system composed by a control plane which performs policy management and prepares processing rules exemplified by flow entries and by a data plane which processes a received packet in accordance with the so prepared processing rules. Such system is able to aggregate the matching key of the processing rule by an upper order bitmask or a lower order bitmask. For example, the present invention may be applied to reduction of entries on a routing table maintained by a forwarding device which forwards packets with the aid of the routing table.

The disclosures of the aforementioned Non-Patent Documents are incorporated by reference herein. The particular exemplary embodiments or examples may be modified or adjusted within the scope of the entire disclosure of the present invention, inclusive of claims, based on the fundamental technical concept of the invention. In addition, a variety of combinations or selection of elements disclosed herein may be made within the context of the claims. That is, the present invention may cover a wide variety of modifications or corrections that may occur to those skilled in the art in accordance with the entire disclosure of the present invention, inclusive of claims, and the technical concept of the present invention.

Explanations of Symbols
11 policy memory
11A, 11B policy tables
12, 12A policy management units
13 aggregation tree memory
13A flow aggregation tree
14 processing rule aggregation unit
14A flow aggregation unit
15A path forming unit
16A traffic information collection unit
21 processing rule memory
21A flow entry table
22, 22A packet processors
23A packet input unit
24A packet output unit
100 packet forwarding system
100A control plane
100B data plane
101 control device
102 forwarding device
200 transmission source device
300 transmission destination device

What is claimed is:
1. A packet forwarding system, comprising:
a policy memory that stores a policy that prescribes processing contents and a matching key that identifies a packet to apply the processing contents to;
a policy management unit that refers to a policy in connection with the packet received to determine the processing contents and an ad-hoc matching key that identifies the packet to apply the processing contents to;
an aggregation tree of a depth corresponding to a length of information which is to become the matching key;
a plurality of nodes branched from a root of the aggregation tree and levels of the nodes representing values of the matching key and mask lengths, respectively;
a processing rule or the policy being registrable in each of the individual nodes;
a processing rule aggregation unit that registers the policy in the node of the aggregation tree corresponding to the matching key of the policy, the processing rule aggregation unit tracing the aggregation tree down from the root thereof based on the ad-hoc matching key determined by the policy management unit to search for and find a node beyond which there is no policy registered along a depth of the tree downwards; the processing rule aggregation unit forming the processing rule including the node of the aggregation tree thus found as the matching key, the processing rule aggregation unit registering the processing rule in the node of the aggregation tree thus found;

a processing rule memory that stores the processing rule formed by the processing rule aggregation unit; and a packet processor that executes registration of the processing rule in the processing rule memory subject to registration of the processing rule by the processing rule aggregation unit in the aggregation tree; the packet processor executing packet processing by having reference to the processing rule stored in the processing rule memory.

2. The packet forwarding system according to claim 1, wherein, the processing rule aggregation unit deletes the processing rule registered in a node which is a parent node for the node of the aggregation tree where the policy has newly been registered; the processing rule aggregation unit causing the packet processor to delete from the processing rule memory the processing rule deleted from the aggregation tree.

3. The packet forwarding system according to claim 2, wherein, if the processing rule is deleted by timeout from the processing rule memory, the packet processor informs the processing rule aggregation unit that the processing rule has been deleted;

the processing rule aggregation unit deleting the processing rule thus informed from the aggregation tree.

4. The packet forwarding system according to claim 2, wherein, a control device includes the policy memory and the policy management unit; and said control device forms the processing rule and distributes the so formed processing rule to each of a plurality of forwarding devices each of which is provided with the processing rule memory and the packet processor.

5. The packet forwarding system according to claim 4, wherein, the control device does not include the policy management unit and includes a forwarding path forming unit that forms a packet forwarding path based on configuration information of forwarding devices and a network topology including the forwarding devices;

the control device causing the processing rule aggregation unit to input a matching key that implements the packet forwarding path formed by the forwarding path forming unit; the control device distributing the processing rule to each of the forwarding devices.

6. The packet forwarding system according to claim 5, wherein, the control device includes a traffic information collection unit that collects from the forwarding devices traffic information recorded using the processing rule;

the forwarding path forming unit forming the packet forwarding path based on the traffic information collected.

7. The packet forwarding system according to claim 1, wherein, if the processing rule is deleted by timeout from the processing rule memory, the packet processor informs the processing rule aggregation unit that the processing rule has been deleted;

the processing rule aggregation unit deleting the processing rule thus informed from the aggregation tree.

8. The packet forwarding system according to claim 7, wherein, a control device includes the policy memory and the policy management unit; and said control device forms the processing rule and distributes the so formed processing rule to each of a plurality of forwarding devices each of which is provided with the processing rule memory and the packet processor.

9. The packet forwarding system according to claim 8, wherein, the control device does not include the policy management unit and includes a forwarding path forming unit that forms a packet forwarding path based on configuration information of forwarding devices and a network topology including the forwarding devices;

the control device causing the processing rule aggregation unit to input a matching key that implements the packet forwarding path formed by the forwarding path forming unit; the control device distributing the processing rule to each of the forwarding devices.

10. The packet forwarding system according to claim 9, wherein, the control device includes a traffic information collection unit that collects from the forwarding devices traffic information recorded using the processing rule;

the forwarding path forming unit forming the packet forwarding path based on the traffic information collected.

11. The packet forwarding system according to claim 1, wherein, a control device includes the policy memory and the policy management unit;

said control device forms the processing rule and distributes the so formed processing rule to each of a plurality of forwarding devices each of which is provided with the processing rule memory and the packet processor.

12. The packet forwarding system according to claim 11, wherein, the control device does not include the policy management unit and includes a forwarding path forming unit that forms a packet forwarding path based on configuration information of forwarding devices and a network topology including the forwarding devices;

the control device causing the processing rule aggregation unit to input a matching key that implements the packet forwarding path formed by the forwarding path forming unit; the control device distributing the processing rule to each of the forwarding devices.

13. The packet forwarding system according to claim 12, wherein, the control device includes a traffic information collection unit that collects from the forwarding devices traffic information recorded using the processing rule;

the forwarding path forming unit forming the packet forwarding path based on the traffic information collected.

14. The packet forwarding system according to claim 1, wherein, the matching key comprises one out of destination IP address and transmission source IP address.

15. A method that forms a processing rule in a packet forwarding system, the packet forwarding system including: a memory that stores an aggregation tree of a depth corresponding to a length of information which is to become a matching key of a policy that prescribes processing contents and the matching key; the matching key identifying a packet to be applied with the processing contents; a plurality of nodes branched from a root of the aggregation tree and levels of the nodes representing values of the matching key and mask lengths, respectively; a processing rule or the policy being registrable in each of individual nodes;

the method comprising:

registering the policy in the node of the aggregation tree corresponding to the matching key of the policy;

referring to the policy in connection with a received packet to decide processing contents and an ad-hoc matching key to identify the packet to be applied with the processing contents; and tracing the aggregation tree down from a root thereof, based on the ad-hoc matching key, to search for and find a node beyond which there is no policy registered along a depth of the tree downwards to form the processing rule including the node thus found as the matching key.

* * * * *